(12) United States Patent
Jia et al.

(10) Patent No.: US 10,293,328 B2
(45) Date of Patent: May 21, 2019

(54) METAL TUNGSTATES FOR USE AS NITROGEN OXIDES REDUCTION CATALYSTS

(71) Applicant: Toyota Motor Engineering & Manufacturing North America, Inc., Plano, TX (US)

(72) Inventors: Hongfei Jia, Ann Arbor, MI (US); Charles A. Roberts, Ann Arbor, MI (US); Mitsuru Sakano, Susono (JP); Keiichi Minami, Susono (JP); Torin C. Peck, Ypsilanti, MI (US); Paul T. Fanson, Brighton, MI (US)

(73) Assignees: Toyota Motor Engineering & Manufacturing North America, Inc., Plano, TX (US); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/875,646

(22) Filed: Jan. 19, 2018

(65) Prior Publication Data
US 2018/0207623 A1 Jul. 26, 2018

Related U.S. Application Data

(62) Division of application No. 14/529,491, filed on Oct. 31, 2014, now abandoned.

(51) Int. Cl.
*B01D 53/94* (2006.01)
*B01J 23/34* (2006.01)
(Continued)

(52) U.S. Cl.
CPC ........ *B01J 23/888* (2013.01); *B01D 53/9413* (2013.01); *B01J 23/34* (2013.01); *B01J 35/002* (2013.01); *B01J 35/023* (2013.01); *B01J 35/1009* (2013.01); *B01J 35/1014* (2013.01); *B01J 37/0238* (2013.01); *B01J 37/10* (2013.01); *B01J 37/346* (2013.01); *C01G 41/00* (2013.01); *C01G 45/00* (2013.01); *C01G 49/0018* (2013.01); *C01G 51/00* (2013.01); *C01G 53/00* (2013.01); *B01D 2251/208* (2013.01); *B01D 2255/2073* (2013.01); *B01D 2255/20738* (2013.01); *B01D 2255/20746* (2013.01);
(Continued)

(58) Field of Classification Search
CPC ...................................................... B01J 23/888
See application file for complete search history.

(56) References Cited

U.S. PATENT DOCUMENTS

2008/0069743 A1* 3/2008 Castellano ......... B01D 53/9418
422/177
2008/0095682 A1* 4/2008 Kharas ............... B01D 53/9418
423/239.1

OTHER PUBLICATIONS

Hanh et al., Crystal quality and optical property of MnWO4 nanoparticles synthesized by microwave-assisted method, J Phys Chem Solids, 74 (2013) 426-430, published online Nov. 19, 2012.
(Continued)

*Primary Examiner* — Melvin C. Mayes
*Assistant Examiner* — Michael Forrest
(74) *Attorney, Agent, or Firm* — Dinsmore & Shohl LLP

(57) ABSTRACT

A nitrogen oxide (NOx) reduction catalyst that includes a transition metal tungstate having the formula: $MWO_4$ wherein M is selected from the group consisting of Mn, Fe, Co, Ni, and Cu. The catalyst may be utilized in various environments including oxygen rich and oxygen deficient environments.

11 Claims, 12 Drawing Sheets

(51) Int. Cl.
*B01J 35/00* (2006.01)
*B01J 35/02* (2006.01)
*B01J 35/10* (2006.01)
*B01J 37/02* (2006.01)
*B01J 37/10* (2006.01)
*B01J 37/34* (2006.01)
*C01G 41/00* (2006.01)
*C01G 45/00* (2006.01)
*C01G 49/00* (2006.01)
*C01G 51/00* (2006.01)
*C01G 53/00* (2006.01)
*B01J 23/888* (2006.01)

(52) U.S. Cl.
CPC ............ *B01D 2255/20753* (2013.01); *B01D 2255/20761* (2013.01); *B01D 2255/20776* (2013.01); *B01D 2255/40* (2013.01); *C01P 2004/03* (2013.01); *C01P 2004/64* (2013.01); *C01P 2006/12* (2013.01)

(56) References Cited

OTHER PUBLICATIONS

Deng et al., Preparation and magnetic properties of CoWO4 nanocrystals, Cryst Res Tech 47, 9, (2012) 1004-1007, published online Jun. 27, 2012.

Zawawi et al Structural and optical characterization of metal tungstates (MW04; M=Ni, Ba, Bi) synthesized by a sucrose-templated method. Chem. Cen. J (2013) 7:80, pp. 1-1O and published online on May 1, 2013.

* cited by examiner

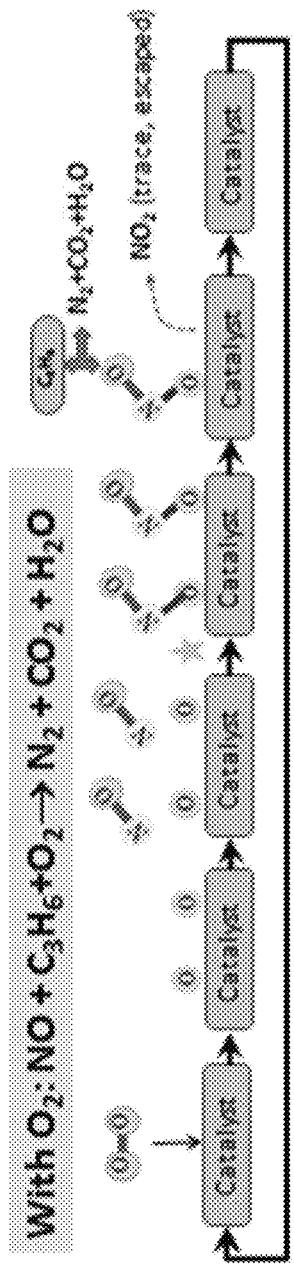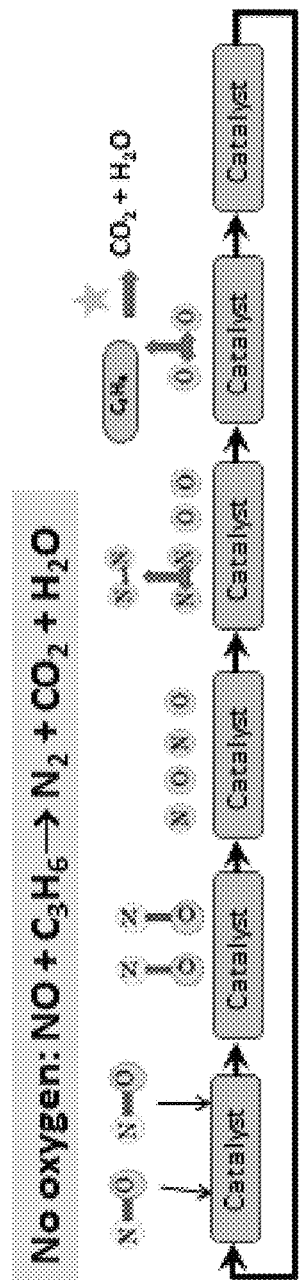
Fig. 12
Fig. 13

METAL TUNGSTATES FOR USE AS NITROGEN OXIDES REDUCTION CATALYSTS

CROSS-REFERENCE TO RELATED APPLICATION(S)

This application is a divisional of U.S. patent application Ser. No. 14/529,491 filed Oct. 31, 2014, now abandoned, the entire contents of which are incorporated herein by reference.

FIELD OF THE INVENTION

The invention relates to a catalyst for reducing nitrogen oxide (NOx) and to a process for reducing nitrogen oxide (NOx).

BACKGROUND OF THE INVENTION

Exhaust from combustion engines creates nitrogen oxide (NOx) that contributes to smog and other forms of environmental pollution. NOx should be removed from the exhaust streams of these engines in order to protect the environment and satisfy government regulations. Current 3-way catalyst converter technology may be used to remove NOx in automotive exhaust under certain limiting conditions. For example, 3-way catalysts operate at high temperatures greater than 300 degrees C. In addition, in order to meet current emissions standards, 3-way catalysts contain a large quantity of precious metals such as platinum, rhodium, and palladium. Further, prior art catalysts may have difficulty in reacting with NOx in the presence of oxygen.

There is therefore a need in the art for an improved catalyst that reduces NOx under various conditions including oxygen rich and oxygen deficient conditions. There is also a need for a catalyst that does not include expensive precious metals and is economical to manufacture. There is a further need in the art for a catalyst that includes a surface that selectively interacts with NOx in the presence of oxygen or in the absence of oxygen. There is also a need in the art for a process for reducing NOx in various conditions including oxygen rich and oxygen deficient conditions.

SUMMARY OF THE INVENTION

In one aspect, there is disclosed a nitrogen oxide (NOx) reduction catalyst that includes a transition metal tungstate having the formula: $MWO_4$ wherein M is selected from the group consisting of Mn, Fe, Co, Ni, and Cu.

In another aspect, there is disclosed a nitrogen oxide (NOx) reduction catalyst that includes a transition metal tungstate having the formula: $MWO_4$ wherein M is selected from the group consisting of Mn, Fe, Co and Cu wherein the catalyst reduces nitrogen oxide (NOx) in an oxygen rich environment including hydrocarbon fuel.

In another aspect, there is disclosed a nitrogen oxide (NOx) reduction catalyst that includes a transition metal tungstate having the formula: $MWO_4$ wherein M is selected from the group consisting of Ni and Co wherein the catalyst reduces nitrogen oxide (NOx) in an oxygen deficient environment including hydrocarbon fuel.

In a further aspect there is disclosed a process of reducing nitrogen oxide (NOx) including the steps of: providing a gaseous exhaust mixture including nitrogen oxide (NOx) and hydrocarbon fuel, providing a nitrogen oxide (NOx) reduction catalyst including a transition metal tungstate having the formula: $MWO_4$ wherein M is selected from the group consisting of Mn, Fe, Co, Ni, and Cu, and contacting the gaseous exhaust mixture with a surface of the nitrogen oxide (NOx) reduction catalyst forming nitrogen, water and carbon dioxide.

BRIEF DESCRIPTION OF THE DRAWINGS

FIG. 12 is a graphical representation of a reduction mechanism for the nitrogen oxide (NOx) reduction catalyst in an oxygen rich condition;

FIG. 13 is a graphical representation of a reduction mechanism for the nitrogen oxide (NOx) reduction catalyst in an oxygen deficient condition.

DETAILED DESCRIPTION OF THE PREFERRED EMBODIMENTS

Figure 1A:
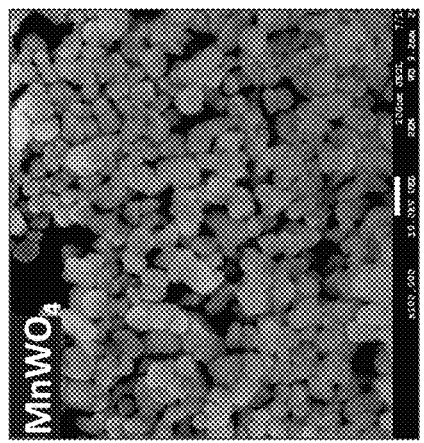
FIG. 1A is a scanning electron microscopy (SEM) image of $MnWO_4$ nanoparticles.
Figure 1B:
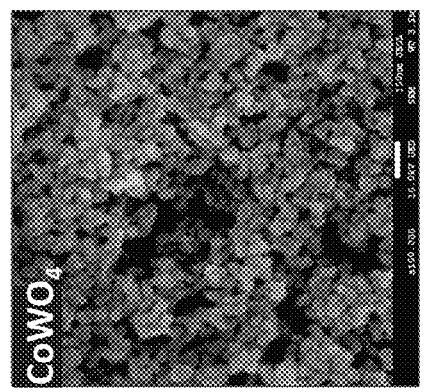
FIG. 1B is a scanning electron microscopy (SEM) image of $CoWO_4$ nanoparticles.
Figure 1C:
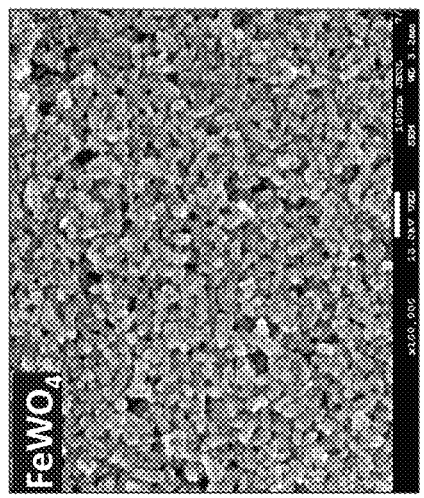
FIG. 1C is a scanning electron microscopy (SEM) image of $FeWO_4$ nanoparticles.
Figure 1D:
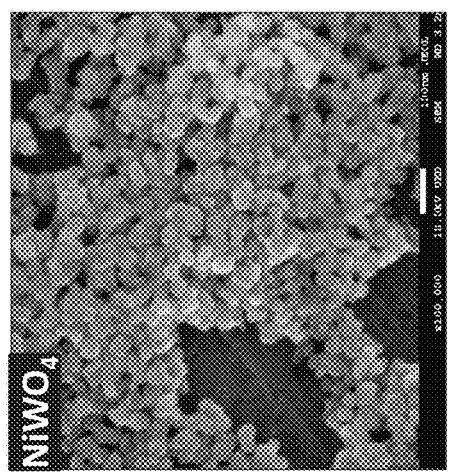
FIG. 1D is a scanning electron microscopy (SEM) image of $NiWO_4$ nanoparticles.
Figure 1E:
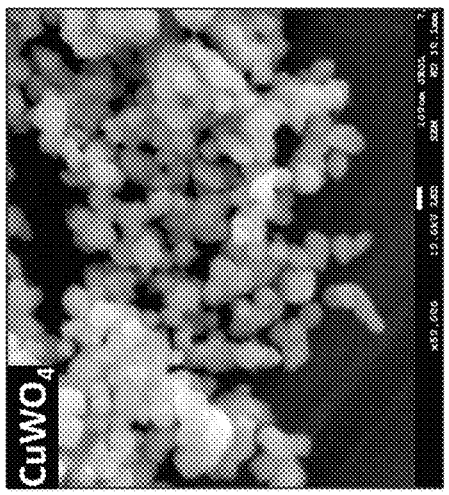
FIG. 1E is a scanning electron microscopy (SEM) image of $CuWO_4$ nanoparticles.

The present disclosure provides a method of forming, process of reducing nitrogen oxide (NOx) and/or catalyst composition for the reduction of nitrogen oxide (NOx) to generate nitrogen, water and carbon dioxide. The catalyst may include a transition metal tungstate having the formula: $MWO_4$ wherein M is selected from the group consisting of Mn, Fe, Co, Ni, and Cu. The catalyst may be utilized in oxygen rich environments and oxygen deficient environments. This catalyst provides a precious metal free catalyst that allows for reaction in a variety of conditions unlike most 3-way catalysts that operate only in narrowly defined conditions. The catalyst allows the selective interaction of nitrogen oxide (NOx) with a surface of the catalyst in oxygen rich and oxygen deficient environments in contrast to current prior art catalysts.

The process includes providing a gaseous exhaust mixture including nitrogen oxide (NOx) and hydrocarbon fuel; providing a nitrogen oxide (NOx) reduction catalyst including a transition metal tungstate having the formula: $MWO_4$ wherein M is selected from the group consisting of Mn, Fe, Co, Ni, and Cu; and contacting the gaseous exhaust mixture with a surface of the nitrogen oxide (NOx) reduction catalyst forming nitrogen, water and carbon dioxide.

In one aspect the nitrogen oxide (NOx) reduction catalyst includes the transition metal tungstate of the formula $MWO_4$ wherein M is selected from the group consisting of Mn, Fe, Co, Ni, and Cu and includes a crystalline structure. The catalyst can include a plurality of transition metal tungstate nanoparticles. In some instances, the nanoparticles are uniform in size and can have an average particle size of 10 to 60 nanometers as best shown in FIGS. 1A-E and FIG. 2.

As described above, the catalyst may be used in a variety of conditions such as oxygen rich and oxygen deficient conditions. In one aspect, the catalyst may have the formula: $MWO_4$ wherein M is selected from Mn, Fe, Co and Cu and the catalyst reduces nitrogen oxide (NOx) in an oxygen rich environment.

In another aspect, the catalyst may have the formula: $MWO_4$ wherein M is selected from Ni and Co and the catalyst reduces nitrogen oxide (NOx) in an oxygen deficient environment.

In another aspect, there is disclosed a process of forming a nitrogen oxide (NOx) reduction catalyst including the steps of: providing metal salts of the transition metal including $Co(NO_3)_2$, $MnCl_2$, $FeCl_2$, $Ni(NO_3)_2$ or $Cu(SO_4)_4$; providing $Na_2WO_4$; combining the metal salt and $Na_2WO_4$ forming a solution; exposing the solution to a source of microwave energy and initiating a hydrothermal reaction forming $MWO_4$. The exposing step may include exposure to microwave energy for various periods of time to elevate the temperature or heat the solution to a desired temperature range.

The exposing step may include exposing the solution to microwave energy from less than one minute to 60 minutes. In one aspect, the exposing step may be from 1 to 10 minutes at a power of 800 Watts. The exposing step may raise the temperature of the solution to a temperature of from 80 to 300 degrees C. Following the exposing step, the solution may be cooled and then washed and dried. Following the drying step, the catalyst material may be calcined in air at 350-700 degrees C. for 60 minutes.

For an oxygen rich condition the catalyst may include a transition metal tungstate having the formula: $MWO_4$ wherein M is selected from the group consisting of Mn, Fe, Co and Cu wherein the catalyst reduces nitrogen oxide (NOx) with hydrocarbon fuel.

Referring to FIG. 12, there is shown a graphical depiction of the catalyst reaction in an oxygen rich condition. As shown in the figure, oxygen adsorbs to a surface of the catalyst and nitrogen oxide (NOx) in the form of nitric oxide (NO, x=1) bonds with the surface adsorbed oxygen forming nitrogen dioxide which reacts with the hydrocarbon fuel forming nitrogen, carbon dioxide and water. The reaction mechanism as described may reduce the overall activation energy barrier for (NOx) or (NO) reduction in typical prior art catalysts.

For the oxygen deficient condition the catalyst may include a transition metal tungstate having the formula: $MWO_4$ wherein M is selected from the group consisting of Ni and Co wherein the catalyst reduces nitrogen oxide (NOx) an oxygen deficient environment including hydrocarbon fuel.

Referring to FIG. 13, there is shown a graphical depiction of the catalyst reaction in an oxygen deficient condition. As shown in the figure, nitrogen oxide (NOx) or (NO) bonds with a surface of the catalyst and the nitrogen oxygen bonds dissociate forming nitrogen and the oxygen reacts with the hydrocarbon fuel forming carbon dioxide and water.

The invention is further described by the following examples, which are illustrative of specific modes of practicing the invention and are not intended as limiting the scope of the invention defined in the claims.

EXAMPLES

Preparation of $MWO_4$.

Starting materials of $Co(NO_3)_2$, $MnCl_2$, $FeCl_2$, $Ni(NO_3)_2$ or $Cu(SO_4)_4$ and $Na_2WO_4 \cdot 2H_2O$ were purchased from Sigma-Aldrich and used directly without further purification. In a typical synthesis a (0.2M) $Na_2WO_4$ solution was combined with a (0.2M) transition metal solution in a stoichiometric manner with strong agitation. The solution mixture was then placed into a glass microwave tube. A microwave assisted hydrothermal synthesis was conducted on a microwave reactor (Anton Paar Microwave 300). The microwave tube was heated to various temperatures at max power (800 W). The exposure to microwaves was maintained for various times as will be discussed in more detail below. Following the exposure to microwaves the tube was cooled by forced air flow. The resulting product was rinsed with DI water multiple times on a centrifuge followed by vacuum drying overnight at 60 degrees C. Following the drying step, the catalyst material was calcined in air at 550 degrees C. for 60 minutes.

Figure 2:
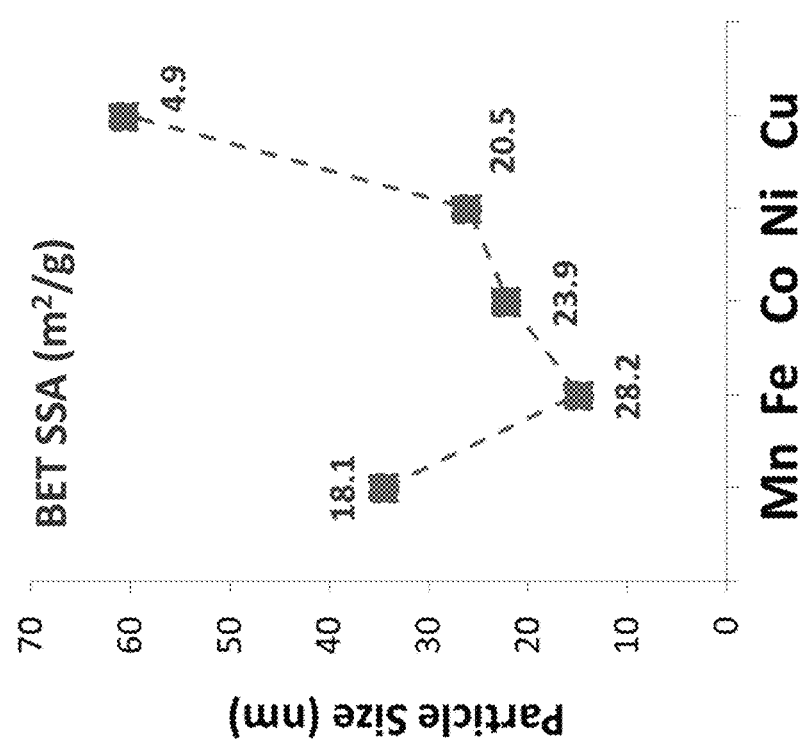
FIG. 2 is a plot of the particle size and corresponding specific surface area (BET SSA) for $MWO_4$ wherein M is selected from Mn, Fe, Co, Ni, and Cu.
Figure 11:
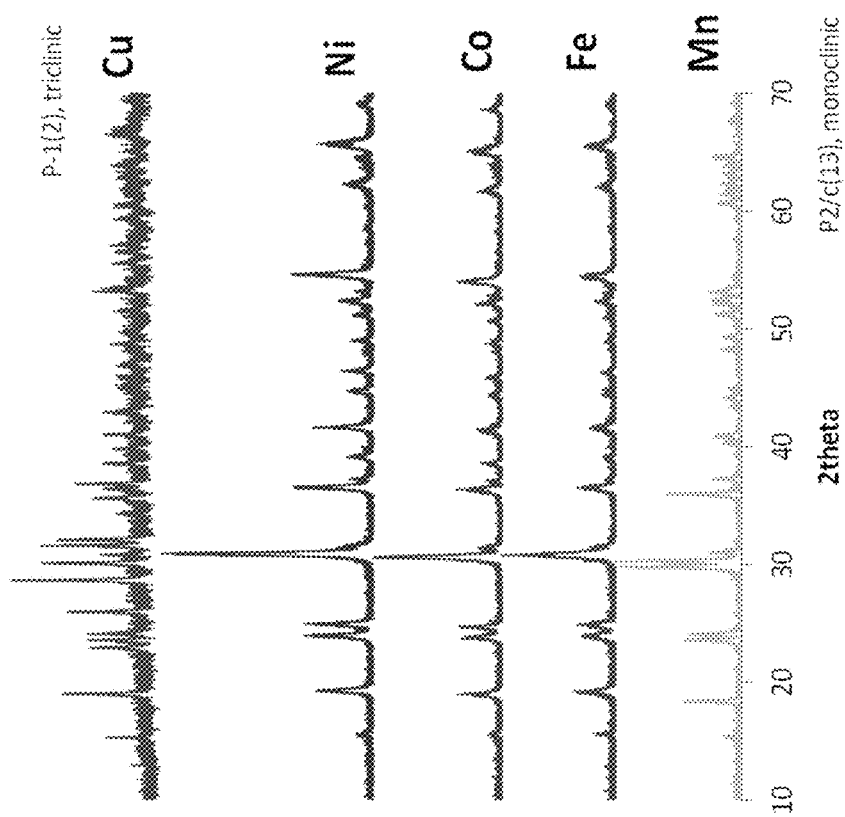
FIG. 11 is an XRD plot of $MWO_4$ wherein M is selected from Mn, Fe, Co, Ni, and Cu.

A final powder product was examined by scanning electron microscopy (SEM) as shown in FIGS. 1A-E. It can be seen in the Figures that $MWO_4$ material includes discrete particles having a size ranging from 10-60 nm. The particles have a specific surface area of from 4.9 to 28.2 $m^2/g$ as depicted in FIG. 2. X-ray diffraction (XRD) data is shown in FIG. 11 and shows a crystalline structure for the catalyst materials.

Example II

Activity Testing $MWO_4$

Figure 3:
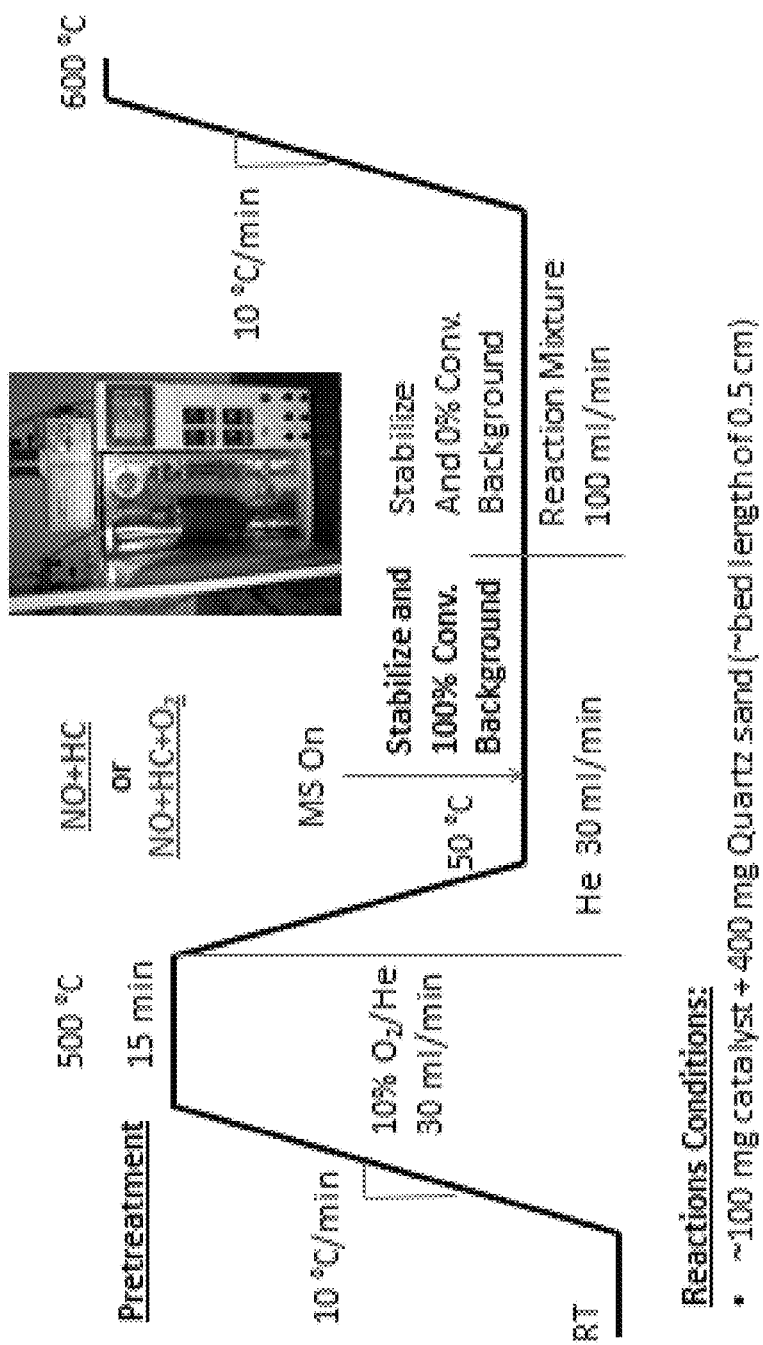
FIG. 3 is a graphical depiction of the testing protocol used for activity tests of the nitrogen oxide (NOx) reduction catalyst.

The activity testing was performed in a laboratory scale packed bed reactor (PID Eng&Tech Microactivity-Reference). Activity was determined for NO reduction by the hydrocarbon propylene (C3H6). Activity testing was performed under stoichiometric conditions both in oxygen deficient and oxygen rich conditions. As depicted in FIG. 3, under oxygen deficient conditions, the stoichiometric ratio of NO:C3H6 is 9:1, and under oxygen rich conditions, the stoichiometric ratio of NO:C3H6:O2 is 3:1:3. Also depicted in FIG. 3, 100 mg of catalyst material was combined with 400 mg of quartz sand and a total flowrate of 100 ml/min (gas hour space velocity GHSV ~15,000 inverse hours) was used for the testing in both oxygen rich and oxygen deficient conditions. A pretreatment phase includes heating the reactor and catalyst mixture to 500 degrees C. and maintaining the temperature for 15 minutes under oxidizing conditions (30 ml/min of 10% O2 in He balance). The reactor is then cooled and maintained at 50 degrees C. for a specified time with the introduction of the gaseous mixture of nitrogen oxide (NOx) in the form of nitric oxide (NO, x=1), hydrocarbon ($C_3H_6$) and oxygen in certain tests. The reactor is then heated to 600 degrees C. Measurements were taken at various temperatures as reflected in the various data which will be discussed in more detail below.

Figure 4:
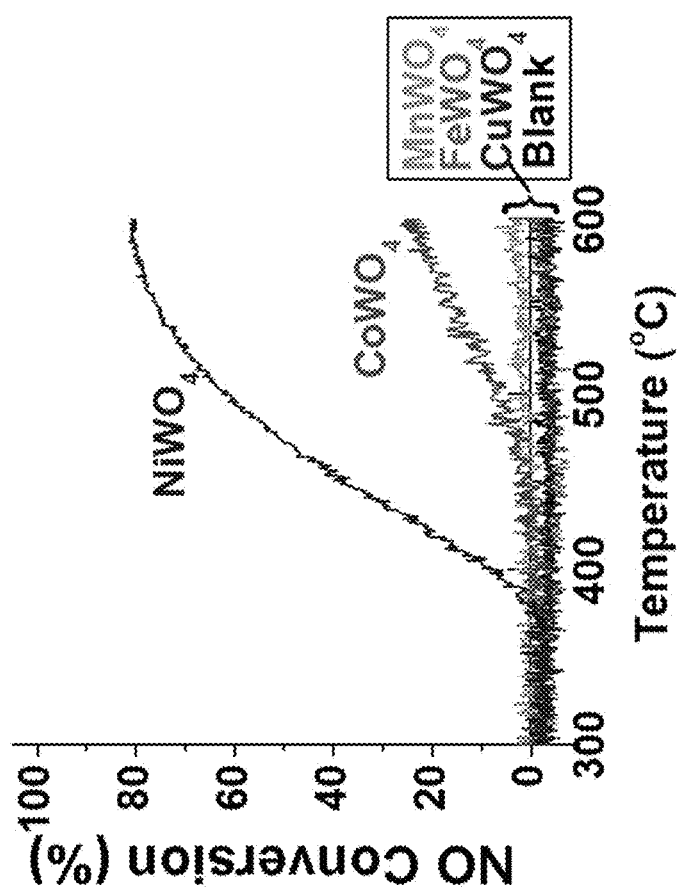
FIG. 4 is a plot of the NO conversion as a function of temperature for the nitrogen oxide (NOx) reduction catalyst without oxygen.

Referring to FIG. 4, there is shown a plot of the NO conversion over the catalyst samples in an oxygen deficient condition in which no oxygen was added to the reactor. As can be seen from the plot, the $NiWO_4$ and $CoWO_4$ samples exhibited NO reduction in the oxygen deficient condition. The reduction of NOx in the oxygen deficient condition verifies the selective interaction of NO with the catalyst surface in the absence of oxygen.

Figure 5:
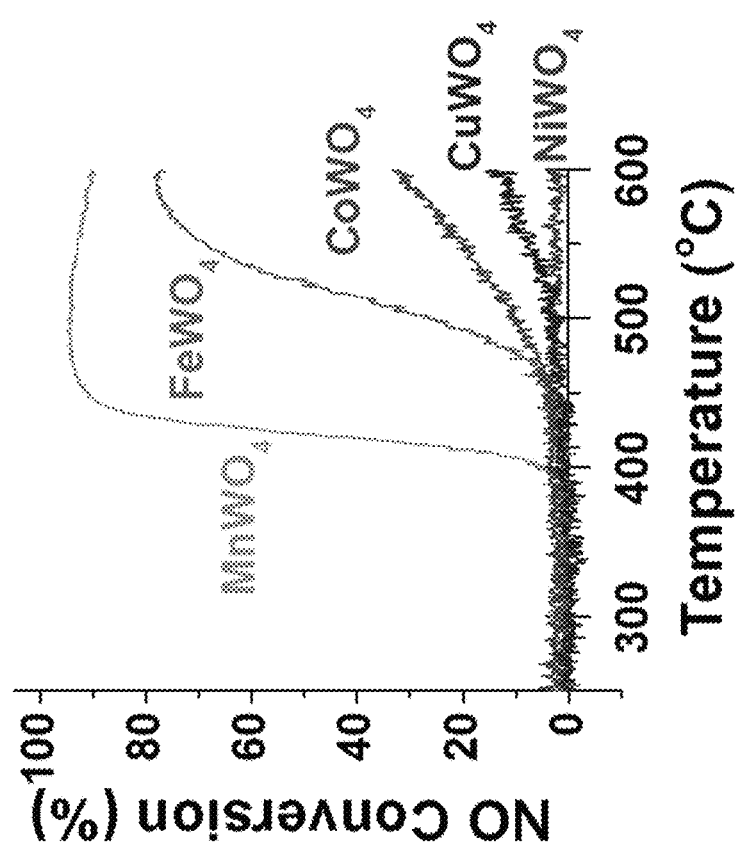
FIG. 5 is a plot of the NO conversion as a function of temperature for the nitrogen oxide (NOx) reduction catalyst with oxygen.

Referring to FIG. 5 there is shown a plot of the NO conversion over the catalyst samples in an oxygen rich condition in which oxygen was added to the reactor. As can be seen from the plot, the $MnWO_4$, $FeWO_4$, $CoWO_4$ and $CuWO_4$ samples exhibited NO reduction in the oxygen rich condition. The reduction of NOx in the oxygen rich condition verifies the selective interaction of NO with the catalyst surface in the presence of oxygen.

Figure 6:
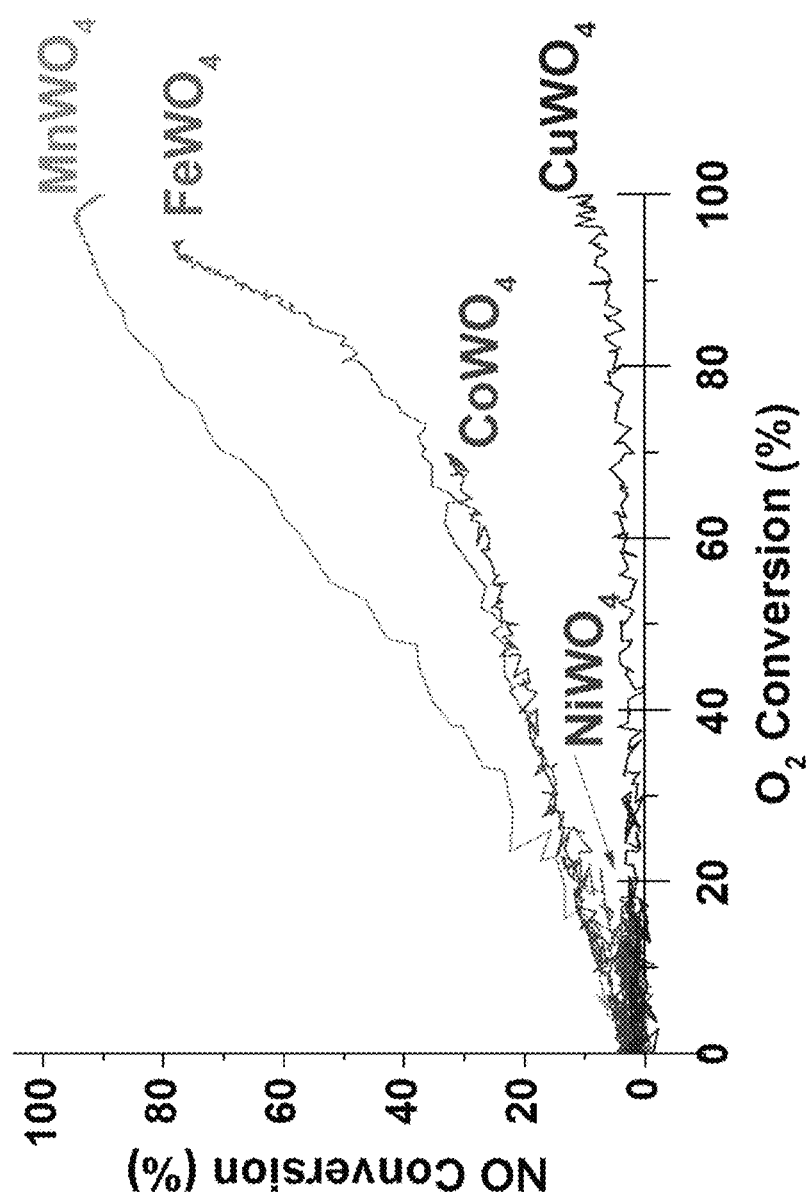
FIG. 6 is a plot of the NO conversion as a function of oxygen conversion for the nitrogen oxide (NOx) reduction catalyst.

FIG. 6 depicts a plot of the NO conversion over the catalyst samples as a function of the $O_2$ conversion under the conditions of stoichiometric NO reduction under oxygen rich conditions in which oxygen was added to the reactor. As can be seen from the plot, the $MnWO_4$, $FeWO_4$, $CoWO_4$ samples exhibit significant NO selectivity. The selectivity herein refers to the ability of the catalyst surface to selectively interact with NO gas rather than $O_2$ gas. The $MnWO_4$ sample displays an almost 1 to 1 selectivity of NO to $O_2$. The ability of the catalyst surface to perform the desired NO reduction reaction in the presence of oxygen provides an improvement over current prior art catalysts.

Figure 7:
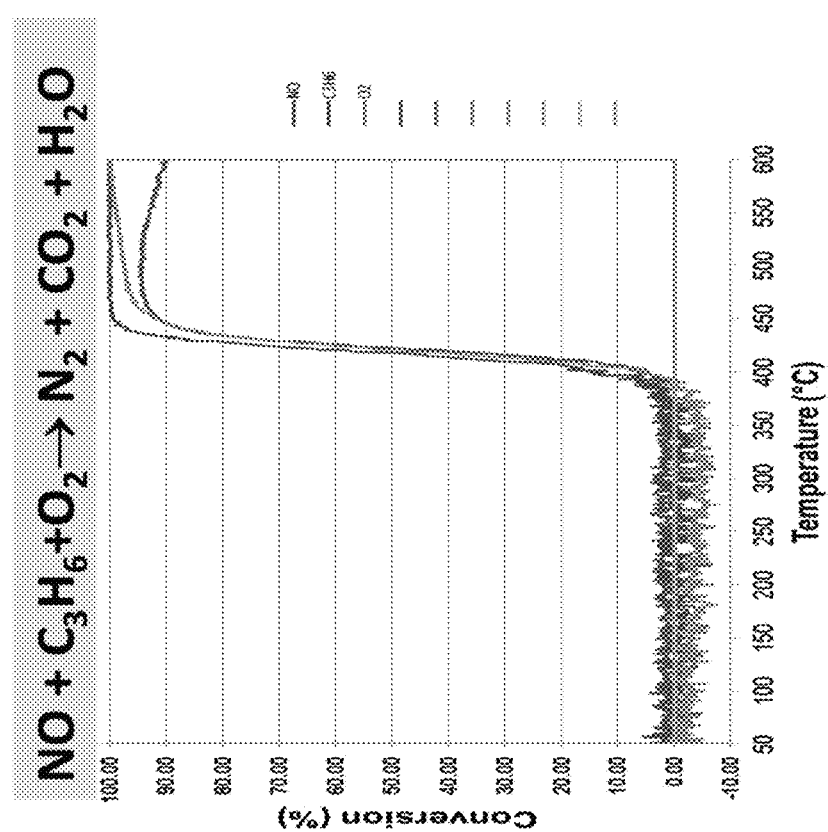
FIG. 7 is a plot of the NO, oxygen and hydrocarbon conversion as a function of the temperature for $MnWO_4$.

Referring to FIG. 7, there are shown NO, C3H6, and O2 conversions as a function of temperature for $MnWO_4$ in an oxygen rich condition in which oxygen was added to the reactor. As can be seen in the figure, the NO conversation exceeds 90% for the sample. The NO conversion dropped as $O_2$ was depleted at higher temperatures.

Figure 8:
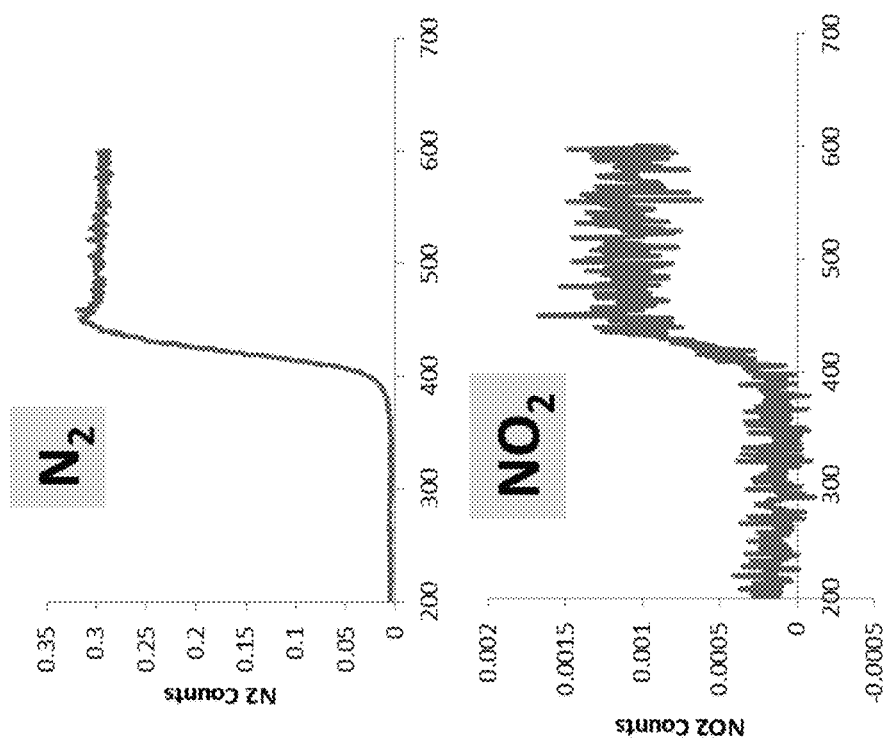
FIG. 8 is a plot of the nitrogen and nitrogen dioxide counts as a function of temperature for $MnWO_4$.

Referring to FIG. 8, production of N2 and NO2 as monitored by the detection of the mass spectrometry counts at m/z=28 and m/z=46, respectively, are shown as a function of temperature in an oxygen rich condition in which oxygen was added to the reactor. FIG. 8 indicates that reduction of NO under oxygen rich conditions results in the production of $N_2$ with trace amounts of $NO_2$ also present.

Figure 9:
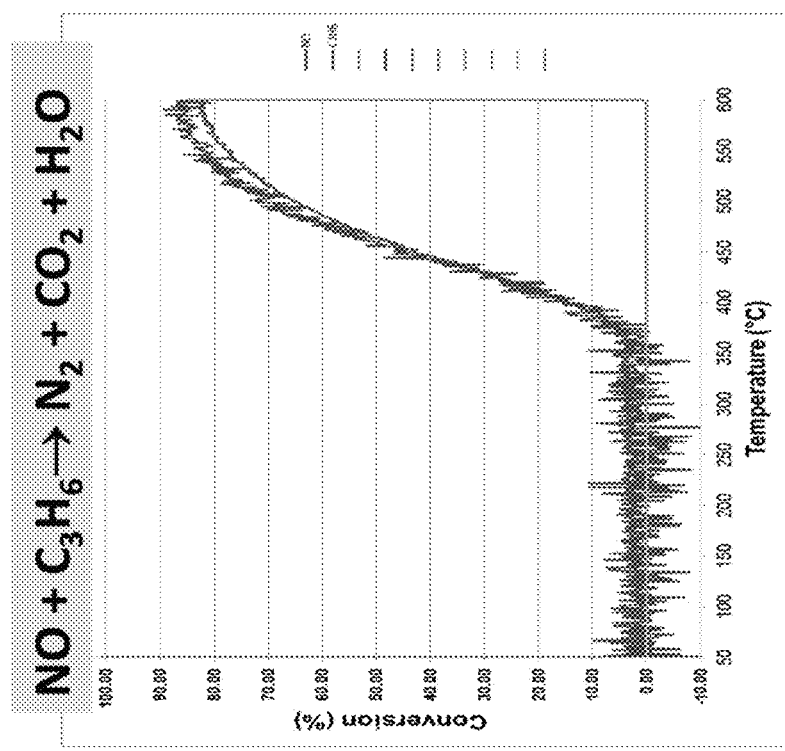
FIG. 9 is a plot of the NO and hydrocarbon conversion as a function of the temperature for $NiWO_4$.

Referring to FIG. 9, there are shown NO and C3H6 conversions as a function of temperature for $NiWO_4$ in an oxygen deficient condition in which no oxygen was added to the reactor. As can be seen in the figure, the NO conversation exceeds 80% for the sample.

Figure 10:
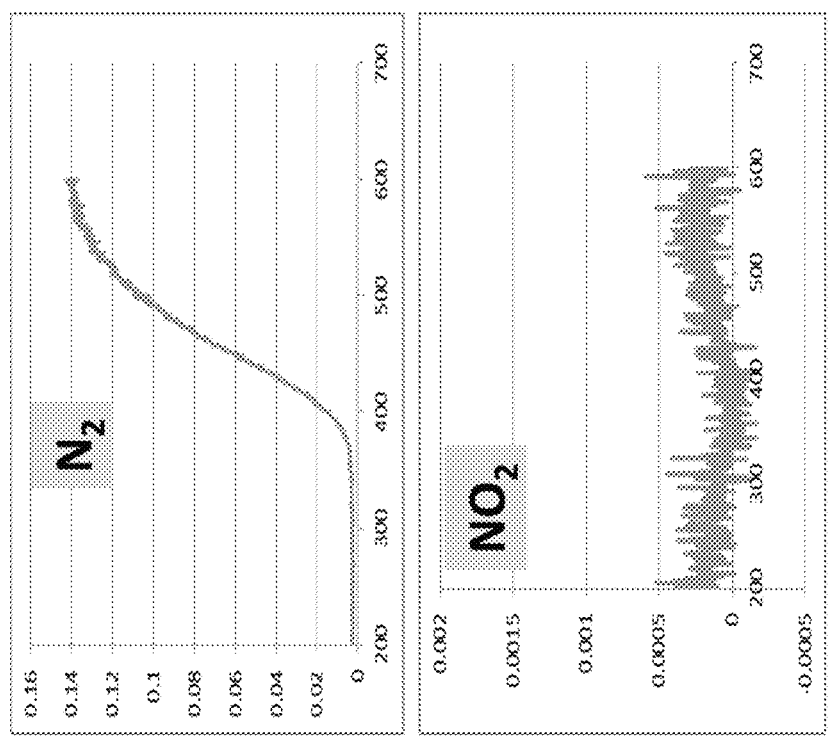
FIG. 10 is a plot of the nitrogen and nitrogen dioxide counts as a function of temperature for $NiWO_4$.

Referring to FIG. 10, production of N2 and NO2 as monitored by the detection of the mass spectrometry counts at m/z=28 and m/z=46, respectively, are shown as a function of temperature in an oxygen deficient condition in which no oxygen was added to the reactor. FIG. 10 indicates that reduction of NO under oxygen deficient conditions results in the production of $N_2$ and with no production of $NO_2$.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. A process of reducing nitrogen oxide (NOx) including the steps of:
   providing a gaseous exhaust mixture including nitrogen oxide (NOx) and hydrocarbon fuel;
   providing a nitrogen oxide (NOx) reduction catalyst including a transition metal tungstate having the formula: $MWO_4$ wherein M is selected from the group consisting of Mn, Fe, Co, Ni, and Cu;
   contacting the gaseous exhaust mixture with a surface of the nitrogen oxide (NOx) reduction catalyst forming nitrogen, water and carbon dioxide.

2. The process of claim 1 wherein the gaseous exhaust mixture further includes oxygen.

3. The process of claim 2 wherein the nitrogen oxide (NOx) reduction catalyst includes a transition metal tungstate having the formula: $MWO_4$ wherein M is selected from the group consisting of Mn, Fe, Co and Cu.

4. The process of claim 1 wherein the nitrogen oxide (NOx) reduction catalyst includes a transition metal tungstate having the formula: $MWO_4$ wherein M is selected from the group consisting of Ni and Co and the catalyst reduces nitrogen oxide (NOx) in an oxygen deficient environment.

5. The process of claim 1 wherein the transition metal tungstate includes a crystalline structure.

6. The process of claim 1 wherein the transition metal tungstate has a particle size of from 10 to 60 nanometers.

7. The process of claim 1 wherein the catalyst has the formula: $MnWO_4$ and the catalyst reduces nitrogen oxide (NOx) in the presence of oxygen.

8. The process of claim 7 wherein the catalyst has significant selectivity to NOx conversion in the presence of oxygen such that the nitrogen oxide (NOx) conversion and oxygen conversion are approximately equal to one another.

9. The process of claim 7 wherein the catalyst has nitrogen oxide (NOx) conversion that is greater than 90 percent.

10. A process of reducing nitrogen oxide (NOx) including the steps of:
    providing a gaseous exhaust mixture including nitrogen oxide (NOx) and hydrocarbon fuel;
    providing a nitrogen oxide (NOx) reduction catalyst including a transition metal tungstate having the formula: $MWO_4$ wherein M is selected from the group consisting of Mn, Fe, Co and Cu;
    contacting the gaseous exhaust mixture with a surface of the nitrogen oxide (NOx) reduction catalyst in the presence of oxygen and forming nitrogen, water and carbon dioxide.

11. A process of reducing nitrogen oxide (NOx) including the steps of:
    providing a gaseous exhaust mixture including nitrogen oxide (NOx) and hydrocarbon fuel;
    providing a nitrogen oxide (NOx) reduction catalyst including a transition metal tungstate having the formula: $MWO_4$ wherein M is selected from the group consisting of Mn, Fe, Co, Ni, and Cu;
    contacting the gaseous exhaust mixture with a surface of the nitrogen oxide (NOx) reduction catalyst in an oxygen deficient environment and forming nitrogen, water and carbon dioxide.

* * * * *